United States Patent

Zhang

[11] Patent Number: 5,649,380
[45] Date of Patent: Jul. 22, 1997

[54] CHANGEABLE DISK LABEL

[76] Inventor: Rudi Zhang, 7529 Lyons St., Morton Grove, Ill. 60053-1160

[21] Appl. No.: 495,718

[22] Filed: Jun. 27, 1995

[51] Int. Cl.⁶ .................................................. G09F 3/20
[52] U.S. Cl. ..................... 40/630; 40/299; 229/74; 229/72
[58] Field of Search ................ 40/630, 159, 299, 40/638; 229/74, 72; 383/38, 40

[56] References Cited

U.S. PATENT DOCUMENTS

| | | | |
|---|---|---|---|
| 2,003,854 | 6/1935 | Cox | 229/72 |
| 2,611,369 | 9/1952 | Herrick | 40/776 |
| 2,859,051 | 11/1958 | Simpson | 40/299 X |
| 2,925,675 | 2/1960 | Lumpkin | 40/661 X |
| 2,964,866 | 12/1960 | Chamberlin | 40/159 X |
| 3,525,470 | 8/1970 | Carrigan | 229/74 |
| 3,628,266 | 12/1971 | Wise | 40/299 |
| 4,585,254 | 4/1986 | Adams | 283/81 |
| 4,589,685 | 5/1986 | Lazer | 283/81 |
| 4,619,399 | 10/1986 | Szuk et al. | 229/72 |
| 4,708,285 | 11/1987 | Segall | 229/68 |
| 4,771,557 | 9/1988 | Bowman | 40/776 X |
| 4,784,408 | 11/1988 | Yasuda | 283/81 |
| 5,040,296 | 8/1991 | Yerger | 30/81 |
| 5,050,792 | 9/1991 | Segall | 229/68 |
| 5,299,675 | 4/1994 | Schumann et al. | 198/392 |
| 5,323,552 | 6/1994 | Fritz | 40/771 |
| 5,388,739 | 2/1995 | Gargan | 40/299 X |

FOREIGN PATENT DOCUMENTS

| | | | |
|---|---|---|---|
| 107838 | 7/1917 | United Kingdom | 229/74 |
| 658352 | 10/1951 | United Kingdom | 229/72 |
| 1314900 | 4/1973 | United Kingdom | 229/72 |
| 2224480 | 5/1990 | United Kingdom | 40/642 |

*Primary Examiner*—Kenneth J. Dorner
*Assistant Examiner*—Cassandra Davis
*Attorney, Agent, or Firm*—Ladas & Parry

[57] ABSTRACT

A changeable disk label, which is to be stuck on a disk cartridge, comprises a rectangular substrate layer having adhesive material spread on a back side for sticking on the disk cartridge, a transparent film layer provided on a front side of the substrate layer and sealed at edge areas of at least three sides of the substrate layer so as to form a pocket between the transparent film layer and the substrate layer, and an intermediate sealing portion formed between two opposite sealed edge areas of the transparent film layer and the substrate layer. This intermediate portion divides the pocket into a front and a back pocket, so that changeable label cards can be removably inserted in the pockets. The opening of the pocket may have a finger notch. A piece of waxed paper is provided on the back side of the substrate layer to cover the adhesive material before the application of the label on the disk cartridge.

12 Claims, 2 Drawing Sheets

U.S. Patent    Jul. 22, 1997    Sheet 1 of 2    5,649,380
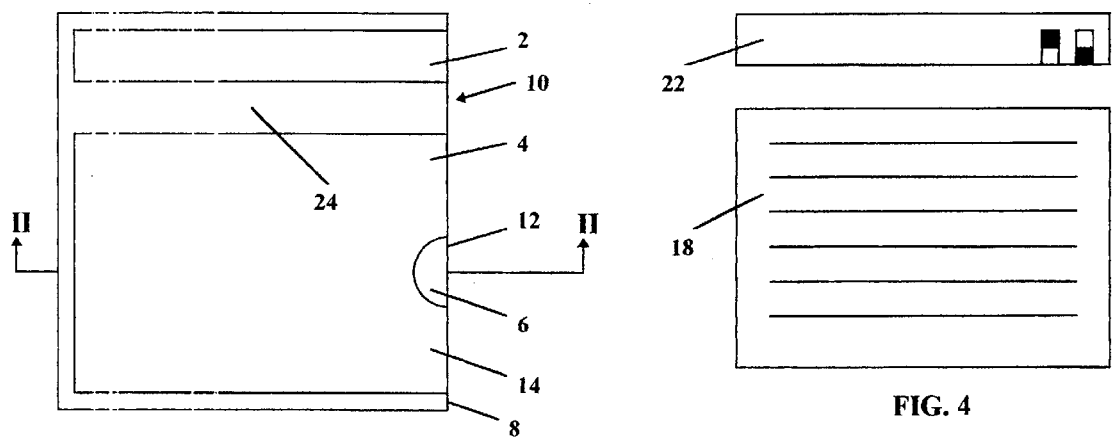
FIG. 1
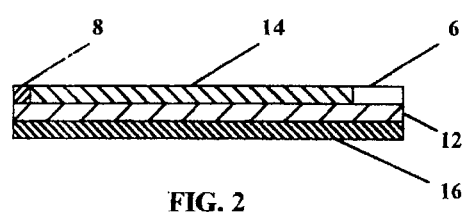
FIG. 2
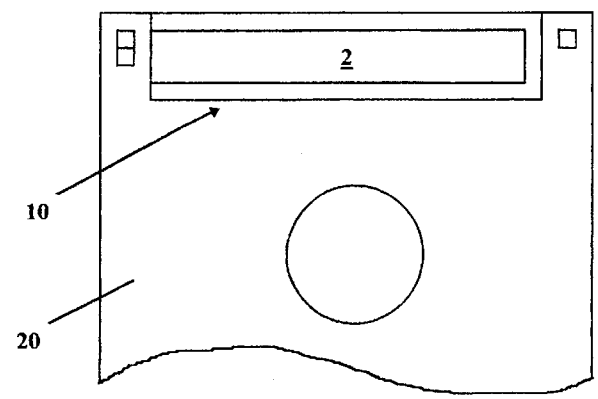
FIG. 4
FIG. 5
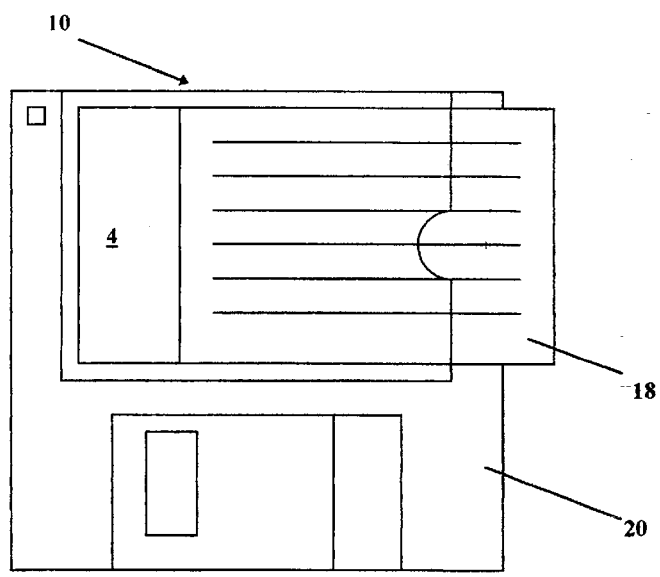
FIG. 3

CHANGEABLE DISK LABEL

This invention relates to stick-on labels for disks or the like. More particularly, the present invention relates to changeable labels for the computer floppy disks.

BACKGROUND OF THE INVENTION

A conventional stick-on label for the computer floppy disks consists of a piece of paper with adhesive material on the back thereof and a piece of waxed paper adhered on the back of the label before the label is affixed to the disk. The waxed paper will be peeled off so that the label can be adhered on the disk cartridge within a shallow recess provided therefor.

The writing area on the label is very limited. In use, the label may be marked up so that the old label has to be removed and replaced with a new one. However, removing an old label is not easy. Sometimes, it cannot be completely removed, leaving some residue on the disk cartridge. Hence, the new label overlying the residue of the old label will have an uneven surface.

Moreover, contents saved on the disk are fequently deleted and replaced. The written contents on the label can be very messy in order to accord all these changes. Thus, the messy label has to be removed and replaced with a new label. Removing the old label may exert certain pressure on the cartridge and most of the time cause the cartridge and the disk to bend a little. Thus, removing and replacing old labels may endanger the thin disk inside the cartridge.

SUMMARY OF THE INVENTION

An object of the present invention is to provide a changeable disk label which eliminates the above disadvantages of the conventional labels.

Another object of the present invention is to provide a changeable disk label which may have double writing space than that of the conventional labels.

A changeable disk label of this invention comprises a rectangular substrate layer having adhesive material spread on a back side thereof, a transparent film layer provided on a front side of the substrate layer and sealed at edge areas of three sides of the substrate layer so as to form a pocket between the transparent film layer and the substrate layer, and a piece of waxed paper being provided on the back side of the substrate layer to cover the adhesive material.

There may be an intermediate sealing portion formed between two opposite sealed edge areas of the transparent film layer and the substrate layer. This intermediate portion divides the pocket into two compartments, one of which is adapted for the main labeling purpose and is much larger than the other compartment. The present invention can be well understood through the following description in association with the accompanying drawings.

BRIEF DESCRIPTION OF THE DRAWINGS

FIG. 1 is a plane view of the label of this invention before affixed on the disk cartridge.

FIG. 2 shows the sectional view of the laminate structure of the label of this invention taken at II—II line in FIG. 1.

FIG. 3 illustrates the front side of the label which has been affixed on the disk cartridge.

FIG. 4 shows two pieces of changeable cards for use as part of the disk label of this invention.

FIG. 5 shows the small compartment of the pocket of this invention as affixed and displayed on the back side of the disk cartridge.

DETAILED DESCRIPTION OF THE INVENTION

Figure 6:
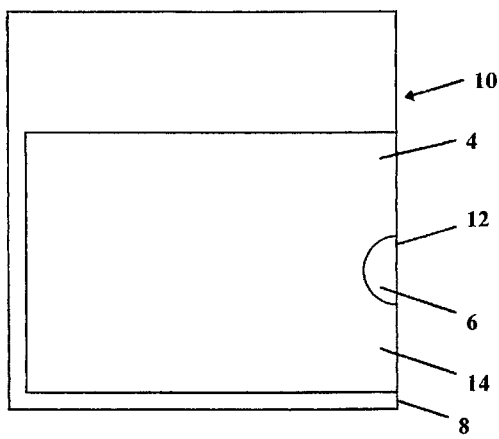
FIG. 6 shows another embodiment of this invention, which has only a front pocket.

With reference to FIG. 1, the label 10 is generally rectangular in shape. The top transparent film 14 is sealed at edge areas of three of four sides with the substrate layer 12 so that the edge seams 8 along the three sides of the transparent film layer 14 define a pocket between the transparent film 14 and the substrate 12.

An intermediate sealing portion 24 is provided to divide the pocket into two compartments 2 and 4, as back and front pockets. The intermediate sealing portion 24 is wider than the edge seams 8. The width of the intermediate sealing portion is a little bigger than the thickness of a disk cartridge and is adapted to be affixed on the rear end of the disk cartridge 20. Thus, the small back pocket or compartment 2 is fit in the recess provided therefor on the back side of the disk cartridge shown in FIG. 5 while the big front pocket 4 is fit in the front side recess of the disk cartridge 20 shown in FIG. 3.

The big front pocket 4 has a finger notch 6 provided at the opening of the pocket or the unsealed side of the transparent film 14. When the label 10 is affixed on the disk cartridge 20, the finger notch 6 and openings of the front pocket 4 and back pocket 2 are facing toward one side of the disk cartridge 20. Therefore, the disk can be smoothly loaded into or unloaded from the floppy drive without any obstruction as does the disk with a conventional stick-on label.

FIG. 2 shows the laminate structure of the changeable disk label of this invention. The label includes the front transparent film layer 14, the substrate layer 12 and a waxed or releasable paper 16. The waxed paper 16 will be peeled off to reveal the adhesive material on the back of the substrate 12. Then, the substrate 12 can be affixed on the disk cartridge 20.

In use, the changeable label cards 18 and 22 (as shown in FIG. 4) can be inserted respectively into the pockets 4 and 2. FIG. 3 illustrates such insertion. Thus, it can be understood that an old changeable or insertable label cards may be easily removed from the pockets and thrown away, while a new one may be used. Moreover, any content can be written on or erased from the card when the card is separated from the disk. Thus, the risk of damaging the disk can be eliminated. Also, the card provides writing space on both sides. Thus, the writing space is twice as much as that of a conventional disk label.

FIG. 6 shows the disk label of this invention without the small back pocket 2. The portion corresponding to the small back pocket 2 may be used for simple identification of the disk. The contents thereon are not frequently changed. Thus, a back pocket 2 is not always necessary.

Figure 7:
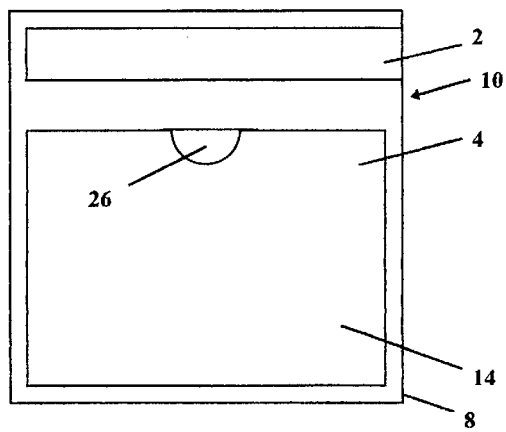
FIGS. 7 and 8 show respectively alternative embodiments of this invention.
Figure 8:
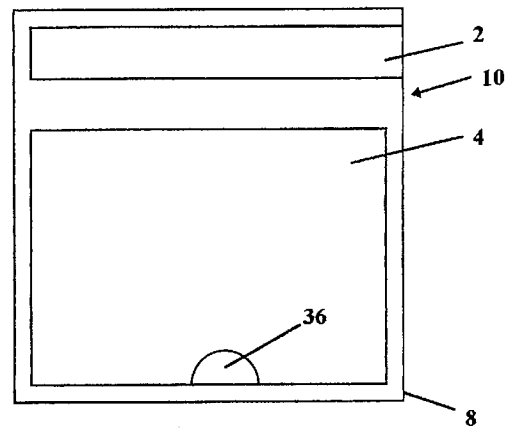

The above description of this invention is based on the preferred embodiments shown in FIGS. 1–6. Other variations are illustrated in FIGS. 7 and 8. The opening of the pocket 4 may be provided facing either the front end or rear end of the disk. In these situations, the transparent film and the substrate may be sealed at all four sides. Nevertheless, in FIG. 8, the seam 8 at the opening of the pocket can be eliminated. The back pocket 2 may be eliminated in FIGS. 7 and 8 as well. The finger notch 6, 26 or 36 is not necessarily provided in any of the embodiments.

I claim:

1. A disk cartridge having front and rear recesses respectively on a front side and a rear side thereof and a rear end connecting the front and rear recesses, and a changeable disk label stuck thereon, said changeable disk label comprising a rectangular substrate layer having an adhesive material spread on a back side thereof for sticking on the disk cartridge, a transparent film layer provided on a front side of the substrate layer and sealed at edge areas of at least three sides of the substrate layer and an intermediate sealing portion so as to form at least a front pocket between the transparent film layer and the substrate layer, said front pocket covering a portion of said disk label at one side of the intermediate sealing portion and being fitted within said front recess of the disk cartridge, said disk label including a back portion at another side of the intermediate sealing portion and being fitted with the rear recess of the disk cartridge, said intermediate sealing portion being fitted over the rear end of the disk cartridge, and at least one changeable label card being removably inserted in said front pocket.

2. The disk cartridge of claim 1, wherein a piece of waxed paper is removably provided on the back side of the substrate layer to cover the adhesive material and can be peeled off when the label is being stuck on the disk cartridge.

3. The disk cartridge of claim 1, wherein said back portion of the disk label includes a back pocket formed between the transparent film layer and the substrate layer, and said intermediate sealing portion is formed between the front pocket and the back pocket, the back pocket having an opening facing a side of the substrate layer perpendicular to the intermediate sealing portion.

4. The disk cartridge of claim 3, wherein said at least one changeable label card is of two pieces, a front piece being removably inserted into the front pocket and a back piece into the back pocket.

5. The disk cartridge of claim 3, wherein an opening of said front pocket is formed toward and along the intermediate sealing portion and the back pocket has an opening facing a side of the substrate layer perpendicular to the intermediate sealing portion.

6. The disk cartridge of claim 3, wherein said front pocket has an opening formed along an end side of the substrate layer parallel with the intermediate sealing portion and the back pocket has an opening facing a side of the substrate layer perpendicular to the intermediate sealing portion.

7. The disk cartridge of claim 1, wherein an opening of said front pocket of the disk label faces toward a side of the substrate layer perpendicular to the intermediate sealing portion.

8. The disk cartridge of claim 4, wherein the opening of the front pocket has a finger notch provided thereat.

9. The disk cartridge of claim 1, wherein four sides of the transparent film layer are sealed with the substrate layer, and an opening of the front pocket is formed by cutting out an appropriate portion of the transparent film along the intermediate sealing portion, thereby defining the front pocket between the transparent film layer and the substrate layer.

10. A changeable disk label stuck on and received within front and rear label recess portions of a disk cartridge and over a rear end of the disk cartridge, said disk label comprising a substrate layer having an adhesive material spread on a back side thereof for sticking on the disk cartridge, a transparent film provided on a front side of the substrate layer and sealed at edge areas of three sides of the substrate layer and an intermediate sealing portion, in a substantial E-shape, to form a front pocket and a back pocket respectively at each side of the intermediate sealing portion, the front pocket being received within the front recess portion of the disk cartridge, the back pocket within the rear recess portion thereof and the intermediate sealing portion over the rear end thereof, and at least two pieces of changeable label cards respectively removably received in the front and back pockets.

11. The changeable disk label of claim 10, wherein said front and back pockets have respectively an opening at an unsealed side of the substrate layer.

12. The changeable disk label of claim 11, wherein said opening of the front pocket has a finger notch thereat.

* * * * *